United States Patent
Kim

(10) Patent No.: US 9,871,486 B2
(45) Date of Patent: Jan. 16, 2018

(54) INVERTER SYSTEM

(71) Applicant: LSIS CO., LTD., Gyeonggi-do (KR)

(72) Inventor: Kyoung-Sue Kim, Gyeonggi-do (KR)

(73) Assignee: LSIS CO., LTD, Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/097,217

(22) Filed: Apr. 12, 2016

(65) Prior Publication Data

US 2016/0301353 A1 Oct. 13, 2016

(30) Foreign Application Priority Data

Apr. 13, 2015 (KR) .................. 10-2015-0052062

(51) Int. Cl.
*H02P 31/00* (2006.01)
*H02P 29/00* (2016.01)
*H02P 6/00* (2016.01)

(52) U.S. Cl.
CPC ............... *H02P 31/00* (2013.01); *H02P 6/00* (2013.01); *H02P 29/00* (2013.01)

(58) Field of Classification Search
CPC ...................................... H02P 31/00
USPC .................................. 318/474, 445
See application file for complete search history.

(56) References Cited

U.S. PATENT DOCUMENTS

| | | | | |
|---|---|---|---|---|
| 4,527,214 A | * | 7/1985 | Hattori | H02H 3/0935 361/24 |
| 4,870,556 A | * | 9/1989 | Inaba | H02M 7/53873 363/37 |
| 5,483,139 A | * | 1/1996 | Welles, II | H02H 7/085 318/782 |
| 8,049,455 B2 | | 11/2011 | Kitanaka | |
| 2013/0320903 A1 | | 5/2013 | Aalund et al. | |

FOREIGN PATENT DOCUMENTS

| | | |
|---|---|---|
| CN | 101895131 A | 11/2010 |
| CN | 202550963 U | 11/2012 |
| CN | 203632553 U | 6/2014 |
| DE | 102013104629 A1 | 11/2014 |
| JP | H6-165521 A | 6/1994 |

(Continued)

OTHER PUBLICATIONS

Search report issued in corresponding European application No. 16160449.1-1806 dated Sep. 14, 2016.

(Continued)

*Primary Examiner* — David S Luo
(74) *Attorney, Agent, or Firm* — K&L Gates, LLP

(57) ABSTRACT

An inverter system includes: an inverter configured to receive utility AC power and step it up to a high-voltage power necessary for operation of a motor and supply the high-voltage power to the motor; a switch connected between the inverter and the motor and configured to be turned on and off such that an output voltage from the inverter is supplied to the motor or interrupted; a current detector configured to detect an output current from the inverter; and a controller configured to control the inverter system so that the inverter is interrupted if an output current value detected by the current detector is smaller than a predetermined reference current value for more than a predetermined reference duration.

7 Claims, 7 Drawing Sheets

(56) References Cited

FOREIGN PATENT DOCUMENTS

| | | |
|---|---|---|
| JP | H07194180 A | 7/1995 |
| JP | 10-337091 A | 12/1998 |
| JP | 2002-112553 A | 4/2002 |
| JP | 2011-135685 A | 7/2011 |
| JP | 2013-17304 A | 1/2013 |
| KR | 20090052897 A | 5/2009 |
| KR | 10120142 B1 | 11/2012 |

OTHER PUBLICATIONS

Office Action dated May 9, 2017 issued in corresponding Japanese Application No. 2016-076983.

\* cited by examiner

PRIOR ART

PRIOR ART

PRIOR ART

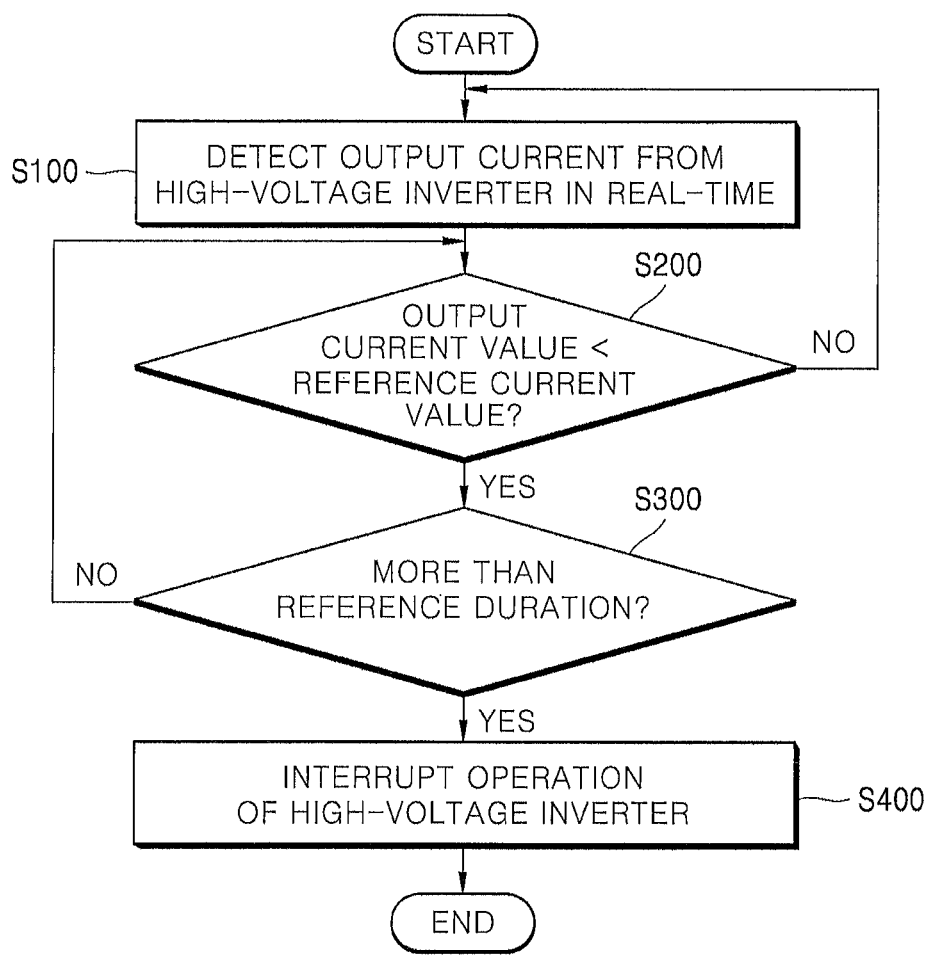

INVERTER SYSTEM

CROSS REFERENCE TO RELATED APPLICATION

This application claims the benefit of Korean Patent Application No. 10-2015-0052062, filed on Apr. 13, 2015, which is hereby incorporated by reference in its entirety.

BACKGROUND

Technical Field

The present disclosure relates to an inverter system. More specifically, the present disclosure relates to an inverter system including a controller for an inverter, by which failure in a high-voltage motor and a high-voltage inverter for driving the motor caused by an erroneous operation of a switch can be prevented, by way of checking an operating state of the switch based on an output current from the high-voltage inverter.

Description of the Related Art

Generally, a high-voltage inverter is an apparatus for controlling an input voltage to a high-voltage motor by adjusting the amplitude and frequency of the voltage input to the high-voltage inverter within the rated voltage of the high-voltage motor.

Such high-voltage motors are commonly installed in major facility of a factory. Since they require very expensive installation cost, a variety of protection apparatus are provided. Specifically, switch gears such as a vacuum circuit breaker (VCB) and a vacuum circuit switch (VCS) are installed between a high-voltage inverter and a high-voltage motor, so that the power is interrupted if an abnormal situation takes place during the operation of the high-voltage motor.

Such switch gears are typically controlled by operating a control panel located in a control room of a factory. A digital contact point is frequently used between the control panel and the switch gear via utility AC power, e.g., AC 220 V.

Although the switch gear is used for protecting the high-voltage motor, sometimes the switch gear itself may be erroneously operated, so that the high-voltage inverter and the high-voltage motor may be damaged. Specifically, erroneous operation due to noise in a control signal sent from the control panel to the switch gear, misfire due to aging of a coil, or misoperation by a user by mistake. As a result, a very big accident may take place. That is, when the switch gear is turned off and immediately turned on during the operation of the high-voltage motor, an overcurrent may occur due to difference in voltage between the high-voltage inverter and the high-voltage motor, so that the high-voltage inverter, the high-voltage motor and the switch gear may be damaged.

FIGS. 1A to 1C are views for illustrating operations of a high-voltage inverter according to the prior art in different operating states.

FIG. 1A shows a high-voltage motor 10 in a normal operating state. When the high-voltage motor 10 is normally operated by a high-voltage inverter 20, the voltage supplied to the high-voltage motor 10 is controlled by the high-voltage inverter 20.

If a switch gear 30 is turned off erroneously while the high-voltage motor 10 is operated, the high-voltage inverter 20 cannot know the operating states of the high-voltage motor 10 and thus keeps outputting voltage, as shown in FIG. 1B. If the switch gear 30 is turned on in this situation as shown in FIG. 1C, the high voltage from the high-voltage inverter 20 is applied to the high-voltage motor 10 instantaneously, such that a failure takes place.

That is, since the high-voltage inverter 20 does not receive a state contact point of the switch gear 30, it cannot know whether the switch gear 30 is turned on or off, and accordingly an accident may occur due to an erroneous operation of the switch gear 30 during the operation of the high-voltage motor 10.

SUMMARY

It is an aspect of some embodiments of the present disclosure to provide an inverter system including a controller for an inverter, by which a failure in a high-voltage motor and a high-voltage inverter for driving the motor caused by an erroneous operation of a switch can be prevented, by way of checking an operating state of the switch based on an output current from the high-voltage inverter.

In accordance with one aspect of some embodiments of the present disclosure, an inverter system includes: an inverter configured to receive utility AC power and step it up to a high-voltage power necessary for operation of a motor and supply the high-voltage power to the motor; a switch connected between the inverter and the motor and configured to be turned on and off such that an output voltage from the inverter is supplied to the motor or interrupted; a current detector configured to detect an output current from the inverter; and a controller configured to control the inverter system so that the inverter is interrupted if an output current value detected by the current detector is smaller than a predetermined reference current value for more than a predetermined reference duration.

According to an embodiment of the present disclosure, failure in a high-voltage motor and a high-voltage inverter for driving the motor caused by an erroneous operation of a switch can be prevented, by way of checking an operation state of the switch based on an output current from the high-voltage inverter.

BRIEF DESCRIPTION OF DRAWINGS

FIG. 4 is a flow chart for illustrating a method for controlling an inverter according to an embodiment of the present disclosure.

DETAILED DESCRIPTION

Figure 1A:
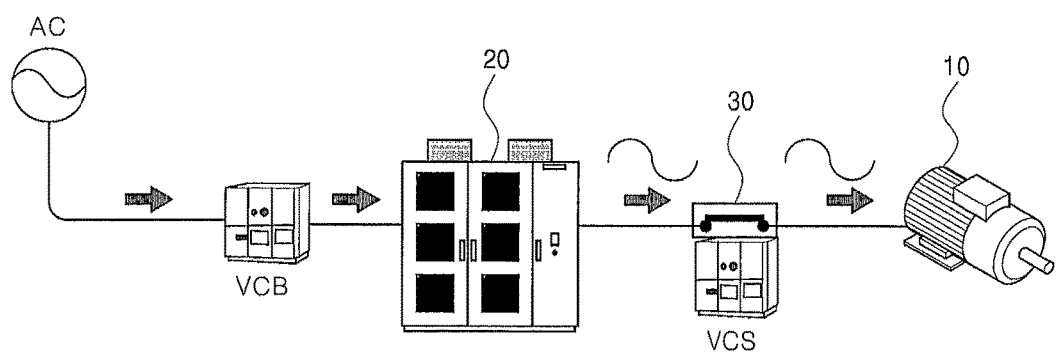
FIGS. 1A to 1C are views for illustrating operations of a high-voltage inverter according to the prior art in different operating states.
Figure 1B:
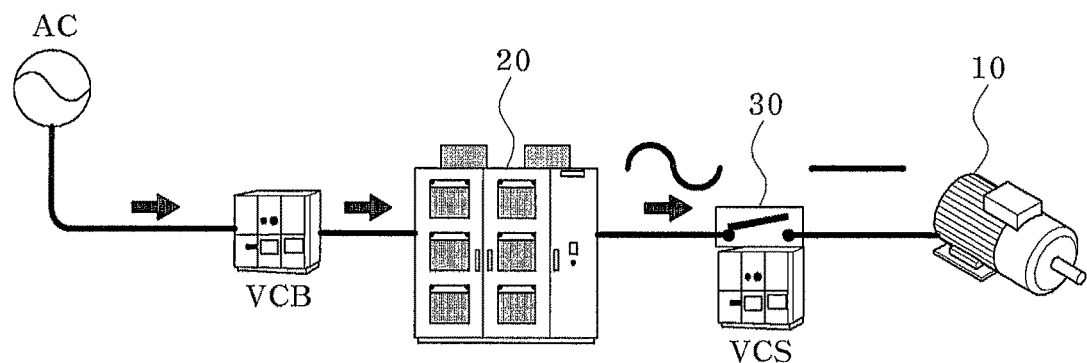
Figure 1C:
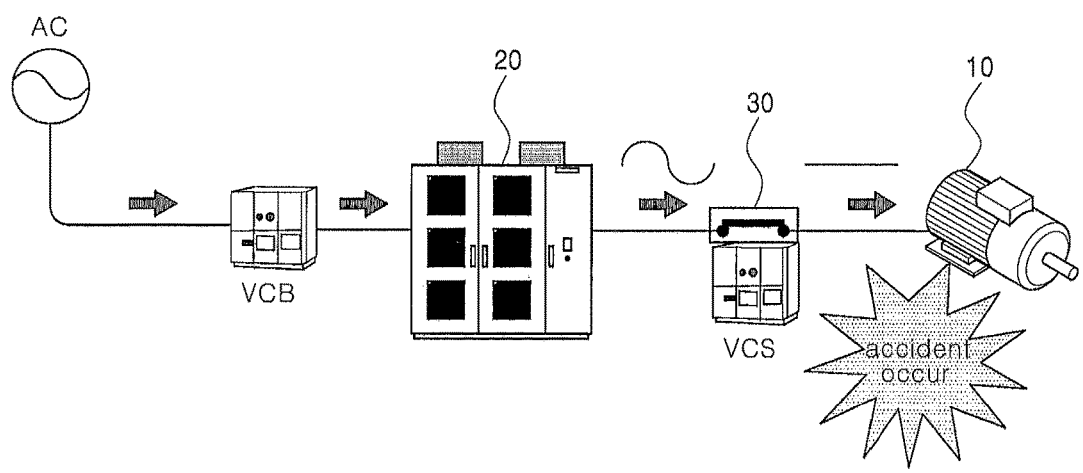

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure.

Hereinafter, embodiments of the present disclosure will be described in detail with reference to the accompanying drawings. The embodiments of the present disclosure may be modified in many different forms and the scope of the disclosure should not be limited to the embodiments set forth herein. Rather, these embodiments are provided so that this disclosure will be thorough and complete, and will fully convey the disclosed concepts to those skilled in the art. Throughout the disclosure, like reference numerals refer to like parts throughout the various figures and embodiments of the present disclosure.

Figure 2:
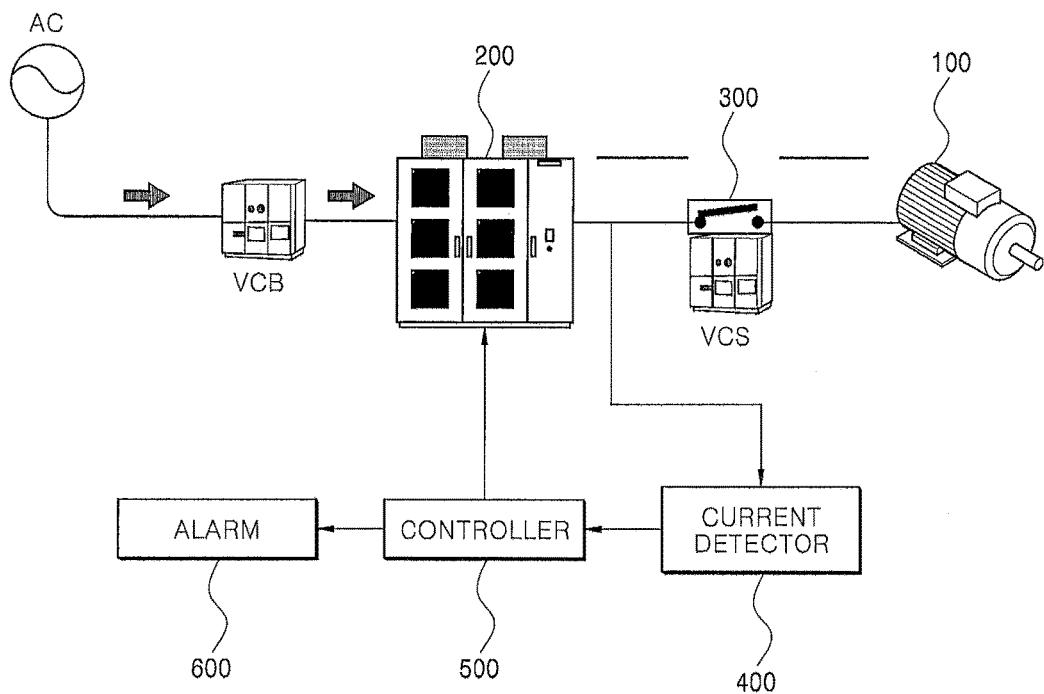
FIG. 2 is a block diagram for illustrating an inverter system according to an embodiment of the present disclosure.
Figure 3A:
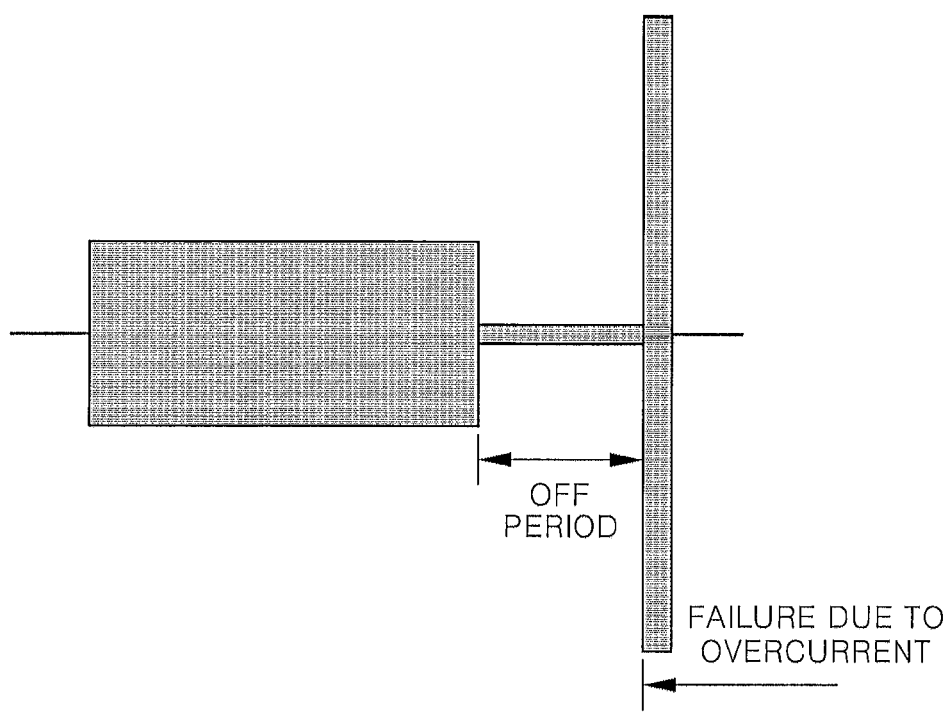
FIGS. 3A and 3B are diagrams showing output currents from an inverter according to operations of a switch according to an embodiment of the present disclosure.
Figure 3B:
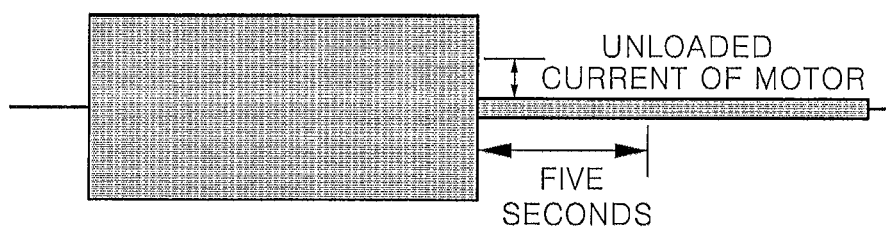

FIG. 2 is a block diagram for illustrating an inverter system according to an embodiment of the present disclosure. FIGS. 3A and 3B are diagrams showing output currents from an inverter according to operations of a switch according to an embodiment of the present disclosure.

Referring to FIGS. 2 to 3c, an inverter system according to an embodiment of the present disclosure mainly includes a high-voltage motor 100, a high-voltage inverter 200, a switch 300, a current detector 400 and a controller 500.

The high-voltage motor 100 is employed in a large-scale production facility such as chemical factories or power plants. The high-voltage motor 100 is connected to the output terminal of the high-voltage inverter 200 and is driven by AC power from the high-voltage inverter 200.

The high-voltage motor 100 refers to motive power machinery that is rotated by electric energy to generate rotation force on its shaft. The high-voltage motor 100 may be connected to the three-phase AC power output terminal of the high-voltage inverter 200, and may be a three-phase induction motor driven by three-phase AC power from the high-voltage inverter 200. The high-voltage motor 100 is well known to those skilled in the art; and, therefore, detailed description thereof will not be given herein.

The high-voltage inverter 200 receives utility AC power of 220 V to step it up to a high-voltage power necessary for operating the high-voltage motor 100, and then supplying it to the high-voltage motor 100.

Specifically, the high-voltage inverter 200 is connected to three-phase utility AC power supply to smooth out AC power components to produce DC power, such that it changes the frequency and voltage via pulse width modulation (PWM) switching to generate a desired output, and supplies the desired power to the high-voltage motor 100.

The high-voltage inverter 200 may applied in industrial high-voltage motors. The high-voltage inverter 200 frequently uses voltage of 3.3 kV, 6.6 kV and 10 kV and frequency of 60 Hz. Utility AC power is directly applied to the high-voltage motor 100.

The high-voltage inverter 200 may be a three-phase cascaded H-bridge inverter, in which a plurality of single-phase inverters are connected in series to generate a phase voltage, and thus can obtain high-voltage power. A single-phase inverter is referred to as a cell.

Each of the cells of the high-voltage inverter 200 may include a rectifier, a DC-terminal capacitor and an inverter. When the high-voltage inverter 200 is powered, the rectifier is turned on, and the DC-terminal capacitor is charged. The rectifier may be a diode such as a semiconductor controlled rectifier (SCR) and remains turned on if powered.

The inverter may include an inverter circuit using a bootstrap capacitor, and may use an insulated gate bipolar transistor (IGBT), a metal oxide silicon field effect transistor (MOSFET) or the like as the switching element of the inverter circuit.

The switch may be connected between the high-voltage motor 100 and the high-voltage inverter 200 and is turned on and off to allow and block the output voltage from the high-voltage inverter 200 to the high-voltage motor 100.

The switch 300 may be implemented as a switch gear such as a vacuum circuit breaker (VCB) and a vacuum circuit switch (VCS).

The current detector 400 may detect the current level from each of the phase terminals of the high-voltage inverter 200 to provide it to the controller 500.

The current detector 400 may include at least one current sensor (not shown) installed in the inverter circuit, and an analog-to-digital converter for converting the detected current to a digital value.

The controller 500 controls the overall operation of the high-voltage inverter 200. Specifically, the controller 500 compares the output current value detected by the current detector 400 with a predetermined reference current value. Then, the controller 500 determines that the switch 300 is erroneously turned off if the output current value detected by the current detector 400 is smaller than the predetermined reference current value for more than a predetermined reference duration, and controls so that the high-voltage inverter 200 is interrupted.

The reference current value is preferably set to an unloaded current value of the high-voltage motor 100, which may vary depending on the rated current of the motor. The reference duration ranges preferably from three to seven seconds, more preferably five seconds.

FIG. 3A is a view showing a waveform of an output current when the switch gear is turned on and off. FIG. 3B illustrates a condition when it is determined that a switch gear of a high-voltage inverter is turned off.

That is, FIG. 3A shows a failure arises when a current smaller than an unload current of the motor is applied during the off state and then an overvoltage output is applied instantaneously when the switch is turned on. In order to prevent such failure, referring to FIG. 3B, if a current smaller than an unloaded current of the motor remains a predetermined time for, say, three to seven seconds, preferably five seconds, it is determined that the switch 300 is erroneously turned off, and the operation of the high-voltage inverter 200 is interrupted.

In addition, if the output current value detected by the current detector 400 is smaller than a predetermined reference current value for more than a predetermined reference duration, the controller 500 may control so that the operation of the high-voltage inverter 200 is interrupted while an alarm signal is output. Accordingly, an alarm 600 may be further included that receives an alarm signal from the controller 500 and warns a user visually and/or audibly.

The alarm 600 may be installed near one of the high-voltage motor 100, the high-voltage inverter 200, the switch 300 and the controller 500, and may be implemented as at least one lamp, light-emitting diode (LED) and/or speaker, etc.

In addition, if the output current value detected by the current detector 400 is smaller than a predetermined reference current value for more than a predetermined reference duration, the controller 500 may interrupt the high-voltage inverter 200 while generating an alarm message to send it to a user's terminal (not shown).

The user' terminal may be, but is not limited to, computers such as a desk top personal computer (PC) and a laptop computer. It is to be noted that the user's terminal may include a variety of wired/wireless communications devices that can be connected to the controller 500 and receive/transmit data from/to it.

For example, the user's terminal may include a variety of mobile terminals capable of communicating via wireless Internet or mobile Internet, as well as a variety of wired/ wireless appliances/communication devices including a palm PC, a smart phone, a digital multimedia broadcasting (DMB) phone with communications capability, a tablet PC, an iPad.

In addition, if the output current value detected by the current detector 400 is smaller than a predetermined reference current value for more than a predetermined reference duration, the controller 500 may interrupt the high-voltage inverter 200 and then resume the high-voltage inverter 200 after the switch 300 is turned on.

Hereinafter, a method for controlling an inverter according to an embodiment of the present disclosure will be described in detail.

FIG. 4 is a flow chart for illustrating a method for controlling an inverter according to an embodiment of the present disclosure.

Referring to FIGS. 2 to 4, the method starts with detecting an output current from the high-voltage inverter 200 in real-time (step S100). Then, the method includes comparing the output current value with a predetermined reference current value (step S200).

In step S200, the reference current value is preferably set to an unloaded current value of the high-voltage motor 100.

If it is determined in step S200 that the detected output current value is smaller than the predetermined reference current value, then it is determined whether the detected output current value lasts for a predetermined reference duration (step S300).

In step S300, the reference duration ranges preferably from three, to seven seconds, more preferably five seconds.

If it is determined in step S300 that the output current value detected in step S100 lasts for the predetermined reference duration, the method includes interrupting the operation of the high-voltage inverter 200 (step S400).

Additionally, the method may further include alarming a user visually and/or audibly after step S400.

Moreover, the method may further include generating and sending an alarm message to the user's terminal.

Subsequent to step S400, when the switch 300 connected between the high-voltage motor 100 and the high-voltage inverter 200 is turned on, the method may include resuming the high-voltage inverter 200.

Although the preferred embodiments of the controller for an inverter of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. An inverter system comprising:
   an inverter configured to receive utility AC power and step it up to a high-voltage power for operation of a motor and to supply the high-voltage power to the motor;
   a switch connected between the inverter and the motor and configured to be turned on and off such that an output voltage from the inverter is supplied to the motor or interrupted;
   a current detector configured to detect an output current from the inverter; and
   a controller configured to control the inverter system so that the inverter is interrupted if an output current value detected by the current detector is smaller than a predetermined reference current value for more than a predetermined reference duration,
   wherein after the inverter is interrupted, the controller is configured to resume the inverter if the switch is turned on.

2. The inverter system of claim 1, wherein the predetermined reference current value is set to an unloaded current value of the motor.

3. The inverter system of claim 1, wherein the predetermined reference duration ranges from three to seven seconds.

4. The inverter system of claim 1, further comprising:
   an alarm configured to warn a user visually or audibly when it receives an alarm signal from the controller, wherein the controller controls the inverter system so that an alarm signal is issued when the inverter is interrupted.

5. The inverter system of claim 1, wherein the controller is configured to interrupt the inverter while generating an alarm message to send to a user's terminal.

6. An inverter system comprising:
   an inverter configured to receive utility AC power and step it up to a high-voltage power for operation of a motor and to supply the high-voltage power to the motor;
   a switch connected between the inverter and the motor and configured to be turned on and off such that an output voltage from the inverter is supplied to the motor or interrupted;
   a current detector configured to detect an output current from the inverter; a controller configured to control the inverter system so that the inverter is interrupted if an output current value detected by the current detector is smaller than a predetermined reference current value for more than a predetermined reference duration; and
   an alarm configured to warn a user visually or audibly when it receives an alarm signal from the controller, wherein the controller controls the inverter system so that an alarm signal is issued when the inverter is interrupted.

7. An inverter system comprising:
   an inverter configured to receive utility AC power and step it up to a high-voltage power for operation of a motor and to supply the high-voltage power to the motor;
   a switch connected between the inverter and the motor and configured to be turned on and off such that an output voltage from the inverter is supplied to the motor or interrupted;
   a current detector configured to detect an output current from the inverter; and
   a controller configured to control the inverter system so that the inverter is interrupted if an output current value detected by the current detector is smaller than a predetermined reference current value for more than a predetermined reference duration,
   wherein the controller is configured to interrupt the inverter while generating an alarm message to send to a user's terminal.

* * * * *